United States Patent [19]
Gordon

[11] Patent Number: 5,788,414
[45] Date of Patent: Aug. 4, 1998

[54] FIBER OPTIC SADDLE

[75] Inventor: George Gordon, East Hanover, N.J.

[73] Assignee: Bell Atlantic Network Services, Inc., Arlington, Va.

[21] Appl. No.: 806,174

[22] Filed: Feb. 26, 1997

Related U.S. Application Data

[62] Division of Ser. No. 459,941, Jun. 2, 1995, Pat. No. 5,683, 211.

[51] Int. Cl.⁶ ............................................... F16L 1/00
[52] U.S. Cl. ........................... 405/154; 137/318; 285/197
[58] Field of Search ........................... 405/154; 285/197; 137/318, 317

[56] References Cited

U.S. PATENT DOCUMENTS

| | | |
|---|---|---|
| 627,074 | 6/1899 | Conway ................ 137/318 X |
| 1,449,150 | 3/1923 | Sampson. |
| 1,452,169 | 4/1923 | Sampson. |
| 1,478,065 | 12/1923 | Sampson. |
| 1,505,076 | 8/1924 | Sampson. |
| 1,785,403 | 12/1930 | Babb. |
| 1,798,205 | 3/1931 | Jewell. |
| 1,855,245 | 4/1932 | Shipley. |
| 1,908,821 | 5/1933 | Cornell, Jr. |
| 1,946,237 | 2/1934 | Robertson, Jr. |
| 2,605,790 | 8/1952 | Schwarzer. |
| 2,736,949 | 3/1956 | Kraemer. |
| 2,990,731 | 7/1961 | Merrill et al. ................ 137/318 |
| 3,263,378 | 8/1966 | Dorris ........................... 52/20 |
| 3,272,211 | 9/1966 | Leopold et al. ................ 137/318 |
| 3,338,601 | 8/1967 | Osweiler ........................ 285/197 |
| 3,364,939 | 1/1968 | Valenziano .................... 137/318 X |
| 3,385,012 | 5/1968 | Lovegreen ........................ 52/21 |
| 3,806,031 | 4/1974 | Olson. |
| 3,891,247 | 6/1975 | Smith. |
| 3,918,748 | 11/1975 | Acda ................................ 285/197 X |
| 3,987,712 | 10/1976 | Croteau. |
| 3,999,785 | 12/1976 | Blakeley ........................ 285/197 X |
| 4,009,545 | 3/1977 | Rossborough ................ 52/20 X |
| 4,067,353 | 1/1978 | Dehoff. |
| 4,253,224 | 3/1981 | Hickman et al. |
| 4,342,475 | 8/1982 | Moran. |
| 4,491,349 | 1/1985 | Rice et al. |
| 4,580,427 | 4/1986 | Akamatsu. |
| 4,601,619 | 7/1986 | Stinnet. |
| 4,825,920 | 5/1989 | Evitts. |
| 4,966,397 | 10/1990 | McKinnon. |
| 5,208,979 | 5/1993 | Schmidt. |
| 5,249,614 | 10/1993 | Osborn. |
| 5,284,406 | 2/1994 | Mueller et al. |
| 5,345,986 | 9/1994 | Kieffer. |
| 5,374,087 | 12/1994 | Powers ........................ 285/197 |

FOREIGN PATENT DOCUMENTS

| | | |
|---|---|---|
| 968700 | 12/1950 | France. |
| 0772-337 | 4/1957 | United Kingdom. |
| 2029916 | 3/1980 | United Kingdom. |

*Primary Examiner*—Dennis L. Taylor
*Attorney, Agent, or Firm*—McDermott, Will & Emery

[57] ABSTRACT

A method for attaching an interduct to a duct by forming a groove on an outer surface of the duct and pressing out that portion of the duct encompassed by the groove to form an opening in the duct. A saddle is then attached to the duct and the interduct the attached to the saddle. The apparatus used for forming the opening in a duct comprises a template having an arcuate portion with a radius substantially the same as the duct. The template has a window portion having substantially the same shape as the opening to be formed in the duct. A base plate is provided having an arcuate portion with a radius substantially the same as the radius of the arcuate portion of the template such that the base plate is slidably fittable over the template. A cutting device is attached to the base plate and has a cutting element extending through the base plate. The saddle has an arcuate portion having a radius substantially the same as the radius of the duct such that the saddle is slidably fittable against the duct and grips the duct. The arcuate portion has a hole formed for accepting a sleeve portion attached to the arcuate portion and communicating with the hole in the arcuate portion.

14 Claims, 10 Drawing Sheets

103

503

FIBER OPTIC SADDLE

This application is a division of application Ser. No. 08/459,941 filed Jun. 2, 1995, now U.S. Pat. No. 5,683,211.

TECHNICAL FIELD

This invention relates generally to an apparatus and method for creating a splice or tap-off point into a conduit, pipe or duct, particularly a duct for carrying fiber optic cables.

BACKGROUND ART

Recently, communications systems have advanced for both personal and business uses. The concept of a "wired nation" connected by an "information highway" has come closer to reality. New communications techniques using fiber optic communications (e.g., fiber-to-feeder, fiber-to-home or the like) allow the transmission of larger quantities of data from point to point, making possible such heretofore impractical concepts as video-on-demand (VOD) or picture phone.

However, with the increased reliance upon these communications systems for both business and recreational use comes the increased inconvenience associated with the interruption of such services. Traditional techniques for stringing wires or fiber optic cable from poles have proven too susceptible to storm and wind damage and in addition are aesthetically displeasing. The traditional solution of cable burial has proven susceptible to other hazards - the weekend gardener or the construction worker accidently severing communications lines during excavation activities. In addition, in prior art burial techniques, it has been difficult to bury additional cables to modify or upgrade a communications network without disturbing the existing buried cables.

One solution to these aforementioned problems has been to place underground wires or cables in a protective conduit or duct. The duct is relatively water-tight or water resistant and is robust enough to withstand at least minor disturbances. Generally, the duct is of such a diameter that additional cables or wires may be "snaked" through at a later date if it is desired to add additional cables.

As shown in Figure 1A, conduit or duct 118 is typically used to connect service pedestals 116, 117 in residential housing subdivisions and in commercial building applications. Utility pedestals 116 and 117 are pedestals which are well known in the art and serve as access points for selected wires or cables carried within a duct system. In addition, pedestals 116 and 117 may carry selected electronic equipment (line amplifiers or the like). Pedestals 116 and 117 are further connected to other portions of the communications system by duct portions 119 and 120 which in turn may be connected to further pedestals or the like.

Duct 118 may be, for example, four inch type "C" duct or duct made of polyvinyl chloride (PVC) to telephone company specifications. Other types of materials may also be used including fire retardant plastics and conceivably, metal. Duct 118 may be used to house fiber optic or coaxial cables or copper conductors. In residential applications, duct 118 is run between service pedestals 116,117 in a subdivision.

Service drops to subscriber's residences 110–115 are run by smaller interducts 121–126 from service pedestals 116, 117. The number of interducts may be varied depending upon the number of subscribers to be connected to the communication system. Here, for the sake of illustration, six such interducts are shown. The term "subscriber" as used in the present application means an individual or household connected to the communications system, however, the term "subscriber" could also refer to a business or other enterprise.

Running interducts 121–126 from pedestals 116,117 has several practical disadvantages. In new home construction, for example, utility lines are often laid before construction begins. Thus, if interducts 121–126 are installed prior to construction, there is a hazard that they may become damaged during the construction process. Between the time of installation of interducts 121–126 and construction of residences 110–115, locations and layout of residences 110–115 may change, forcing the utility company to return to the site to dig up existing interducts 121–126 and install new ones. Since interducts 121–126 are run to pedestals 116,117, an entire trench must be dug back to pedestals 116,117, along duct 118, to remove the old interduct and a new trench dug to install a new one. This technique involves extensive digging and introduces the risk of damage to duct 118.

In commercial applications, it is often desirable to use fire resistant duct to enclose communications cables. In many commercial facilities, such as offices, the locations of individual offices and data facilities (telephone, computer rooms and the like) are often determined after the shell of the building has been constructed and the utilities installed. Further, office spaces are subject to periodic rearrangement. It is difficult to provide suitable access points in the duct system that anticipate all possible future needs without escalating costs dramatically. Cutting into an existing duct is dangerous, as the signal cables within the duct accidentally may be cut or damaged during the process.

One approach to solving this problem is to delay installation of interducts 121–126 until the corresponding subscriber home (or in a commercial application, office) is completed. This approach, however, still requires that a long trench be dug from the pedestal to the home after the home is completed. FIG. 1B shows a more direct technique for installing interducts which avoids the necessity of digging a long trench. For example, once subscriber home 113 has been located, interduct 134 is tapped off from duct 118 directly, rather than from pedestal 116 or 117. Thus, as an example, for subscriber home 113, a trench need only be dug directly from subscriber home 113 to duct 118 to house interduct 134. This approach uses less duct, involves less digging, and does not disturb buried duct 118 as much as the technique shown in FIG. 1A. The approach shown in FIG. 1B, however, requires that a safe, economical and easy to use technique be available to tap-off the existing duct 118.

FIG. 2 shows an apparatus disclosed in Moran U.S. Pat. No. 4,342,475, issued Aug. 3, 1982. A technique is illustrated for tapping off a multiple bore conduit 10 with connection 28 comprising a saddle element 31 coupled to a sleeve element 29 or 30 to feed a tubular duct 11. A separate bore is provided for each wire or bundle of wires. The multi-bore duct has obvious disadvantages in that it can only carry a limited number of wires. Further, such a duct is not easily fabricated. As a result, the industry today has standardized on a so-called "C" duct, made of polyvinylchloride (PVC), typically four inches in diameter. A number of wires or cables can be carried through one "C" duct, and additional wires can be added at a later time by "snaking" the wires through the duct from pedestal to pedestal.

Application of the tap-off technique of Moran to a "C" duct presents difficulties in breaching the duct in order to form the tap-off point. Cutting into a duct always risks cutting a cable or wire within the duct. Splicing cut wires within a duct, typically at the bottom of an open trench, is both messy and difficult. With the introduction of fiber-optic cable the problem is compounded further. Fiber-optic cables are difficult and expensive to splice, and a splice may introduce a signal loss into the fiber optic signal path. In many instances, a cable sheath can be nicked or abraded during the cutting process without notice by the installer. Over a period of time, such nicks can allow moisture to enter, causing corrosion, and eventually failure of the cable. The installer must then return to the site and dig again to make necessary repairs, further disturbing duct 118.

The duct tap-off technique of Moran also poses the hazard of introducing contaminants into the duct in the form of chips, dust, etc. created by the cutting process. Chips and duct can accumulate in the duct and abrade or nick cables being snaked through a duct. Such contaminants can cause friction between a cable being snaked through a duct and existing cables, making the snaking process more difficult, especially in long runs. This contamination problem would exist in like manner in joining plumbing pipes where such contaminants can clog or damage fittings, valves, or the like.

The tap-off device of Moran, being made up of a multi-piece saddle and tap, can be difficult to install when working at the bottom of an open trench. Both pieces must be properly aligned and set in place while adhesive or clamping devices are used. The multi-piece construction increases costs, as the pieces themselves are expensive to manufacture, and an inventory of the various types of tap-offs (corner, side, top) must be maintained. Prior art PVC plumbing fittings are also expensive, with a simple street ell or tee fitting costing as much as a ten foot length of pipe.

Thus, it is an object of the present invention to provide a technique for tapping off a duct or pipe without endangering or contaminating the contents of that duct or pipe.

It is a further object of the present invention to provide a technique for tapping off a duct or pipe which can be easily and quickly implemented in a working environment.

It is an even further object of the present invention to provide a effective, low cost technique for tapping off a duct or pipe.

DISCLOSURE OF THE INVENTION

The present invention comprises a method of attaching an interduct to a duct by forming a groove on the outer surface of the duct in the shape of an opening to be formed in the duct and pressing out that portion of the duct encompassed by the groove to form an opening in the duct. A saddle is then attached to the duct and the interduct then attached to the saddle.

The present invention also comprises an apparatus for forming an opening in a duct comprising a template with an arcuate portion having a radius substantially the same as the duct radius. The template has a window portion of substantially the same dimension as the opening to be formed in the duct, formed on the arcuate portion of the template. A base plate is provided having an arcuate portion with a radius substantially the same as the duct radius such that the base plate is slidably fittable over the duct. The base plate has a hole passing through the arcuate portion. A cutting device is attached to the base plate and has a cutting element extending through an opening in the base plate. The cutting element extends into at least a portion of the duct when the base plate is slidably fitted over the duct thereby to cut an opening periphery in the duct.

The present invention also comprises a saddle for use in tapping off an interduct from a duct. The saddle comprises an arcuate portion having a radius substantially the same as the radius of the duct such that the saddle is slidably fittable against the duct and grips the duct. The arcuate portion has an opening formed for accepting a sleeve portion attached to the arcuate portion and communicating therewith. The sleeve portion is adapted to be coupled to the interduct.

BEST MODE FOR CARRYING OUT THE INVENTION

Figure 3:
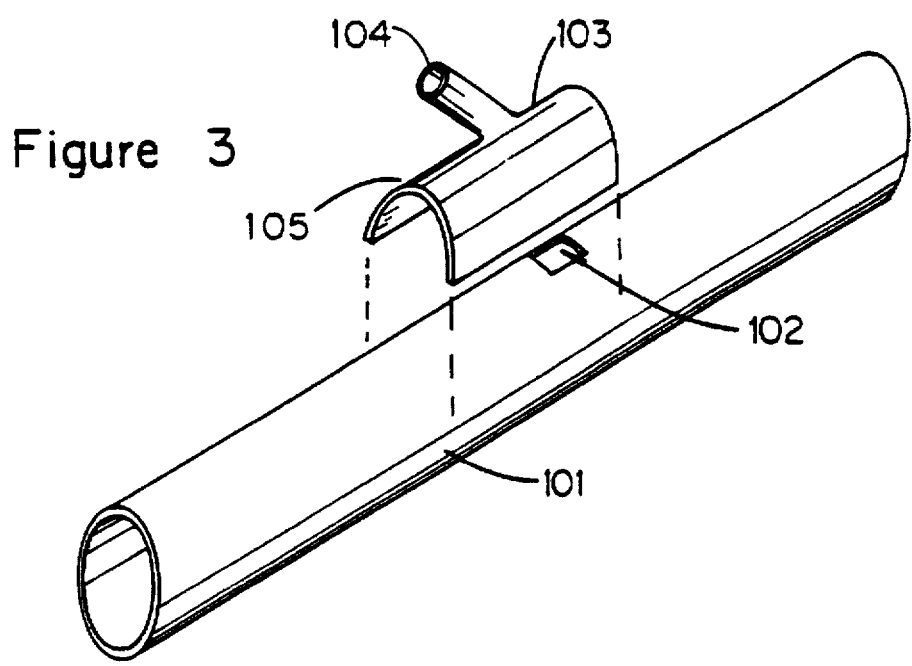
FIG. 3 is a representation of an exploded perspective view of the saddle of the present invention being installed on a duct.

FIG. 3 shows an exploded perspective view of saddle 103 of the present invention, as applied to duct 101 having an opening 102 formed therein. As will be discussed below in conjunction with FIGS. 6A–6C, 7A–7C, and 8A–8C, opening 102 may be formed using a technique which is also a subject of the present invention. Saddle 103 comprises an arcuate portion 105 having a radius substantially the same as the radius of duct 101, and a sleeve portion 104 which is attached to and provides passage through arcuate portion 105.

Once opening 102 has been formed, saddle 103 is placed over duct 101 such that an end of sleeve portion 104 at arcuate portion 105 is contiguous with opening 102. Arcuate portion 105 of saddle 103 may be formed from a portion of the material used for duct 101 (e.g., four inch "C" duct or the like). Making the arcuate portion 105 of saddle 103 from duct material provides two advantages. First, the cost of the saddle can be kept low, as arcuate portion 105 of saddle 103 can be constructed from discarded scrap portions of duct material left over from the installation of duct 101. These savings can be further compounded by cutting these scrap sections of duct lengthwise, to produce two arcuate portions 105 from each section of scrap duct. Second, if arcuate portion 105 of saddle 103 is constructed from duct material, the internal diameter of arcuate portion 105 of saddle 103 will be slightly less than the outer diameter of duct 101. Thus, when saddle 103 is placed over duct 101, the saddle will tend to "snap" into place, effectively gripping duct 101. This gripping action verifies to the installer that the saddle is properly in place and also serves to hold the saddle during subsequent gluing, clamping, or chemical welding operations. When installing saddle 103 to duct 101 at the bottom of an open trench, this gripping action eases installation, as the installer does not need to hold saddle 103 in place, thus leaving both hands free to secure saddle 103 or for other activities.

Saddle 103 can be fixedly attached to duct 101 by the use of chemical welding or adhesive, or by the use of band clamps, or by a combination of any of the three. Further, band clamps nay be used to secure saddle cur.103 to duct 101 while adhesive or chemical welds are curing. If band clamps alone are to be used, it may be desirable to place a gasket (not shown) between arcuate portion 105 of saddle 103 and duct 101 to provide a water-tight or water resistant seal.

Figure 1A:
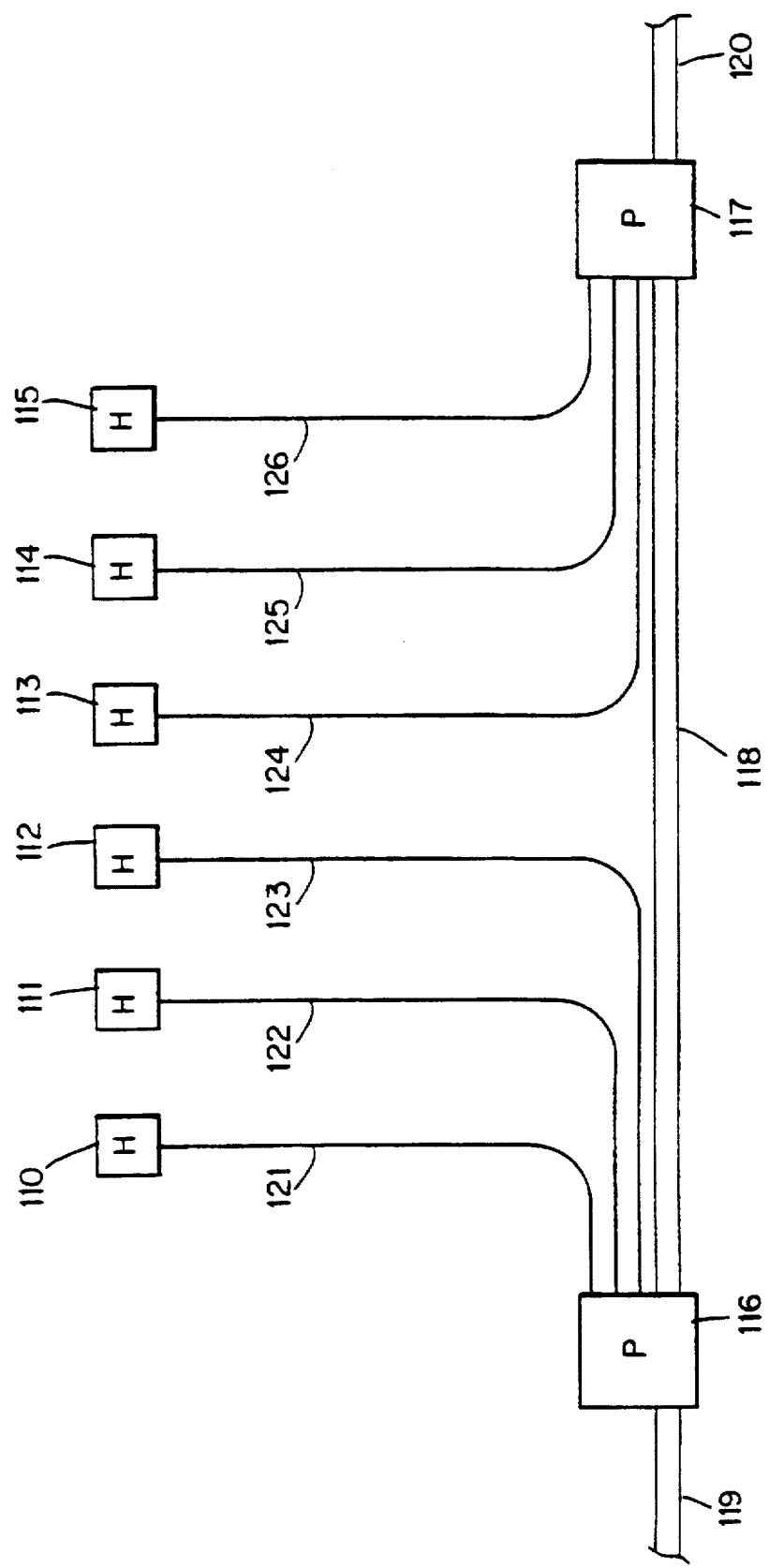
FIG. 1A is a schematic diagram showing a prior art technique for installing interducts in a residential subdivision.
Figure 1B:
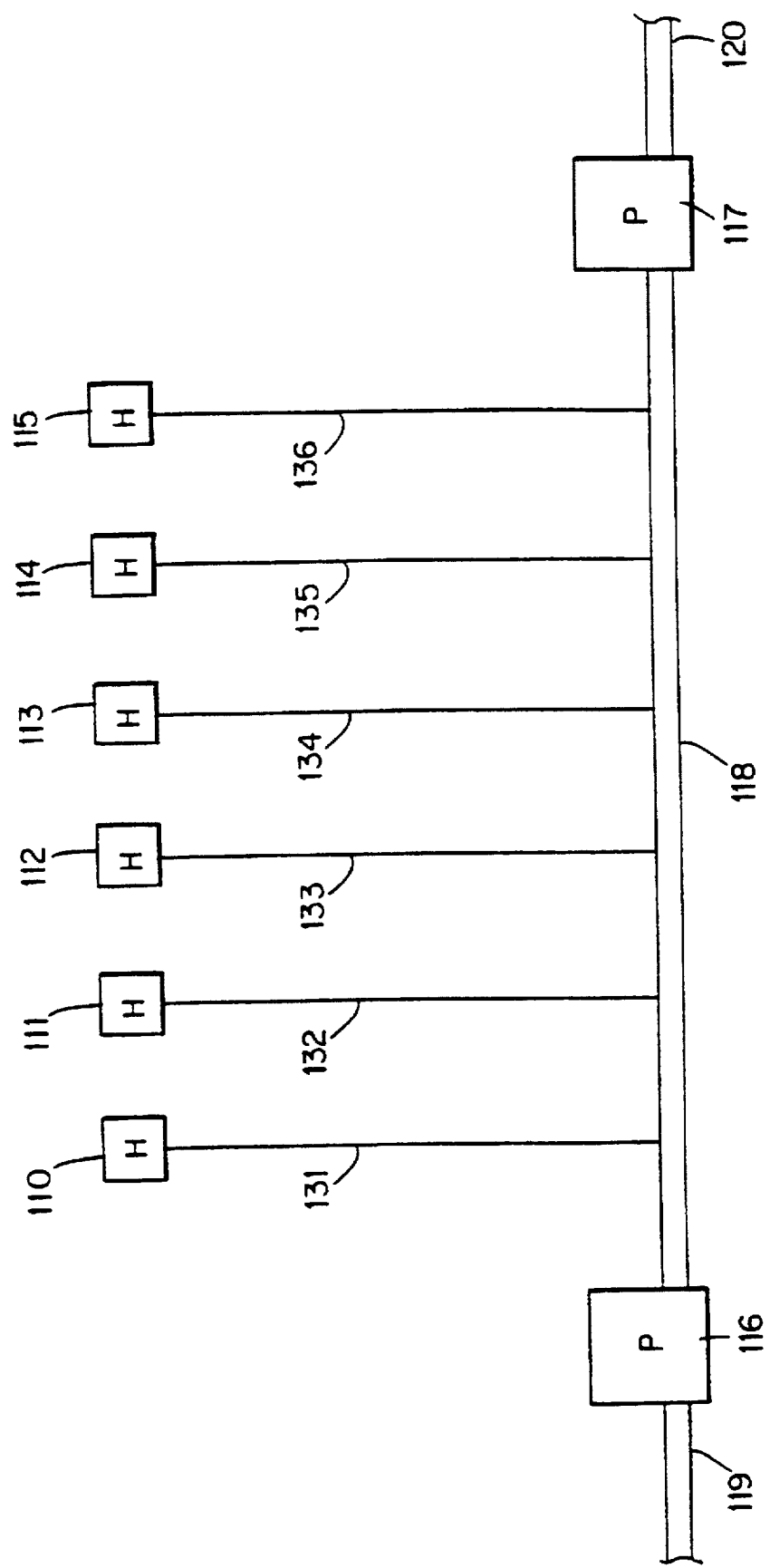
FIG. 1B is a schematic diagram showing a technique for use with the present invention for attaching interducts to a duct in a residential subdivision.
Figure 2:
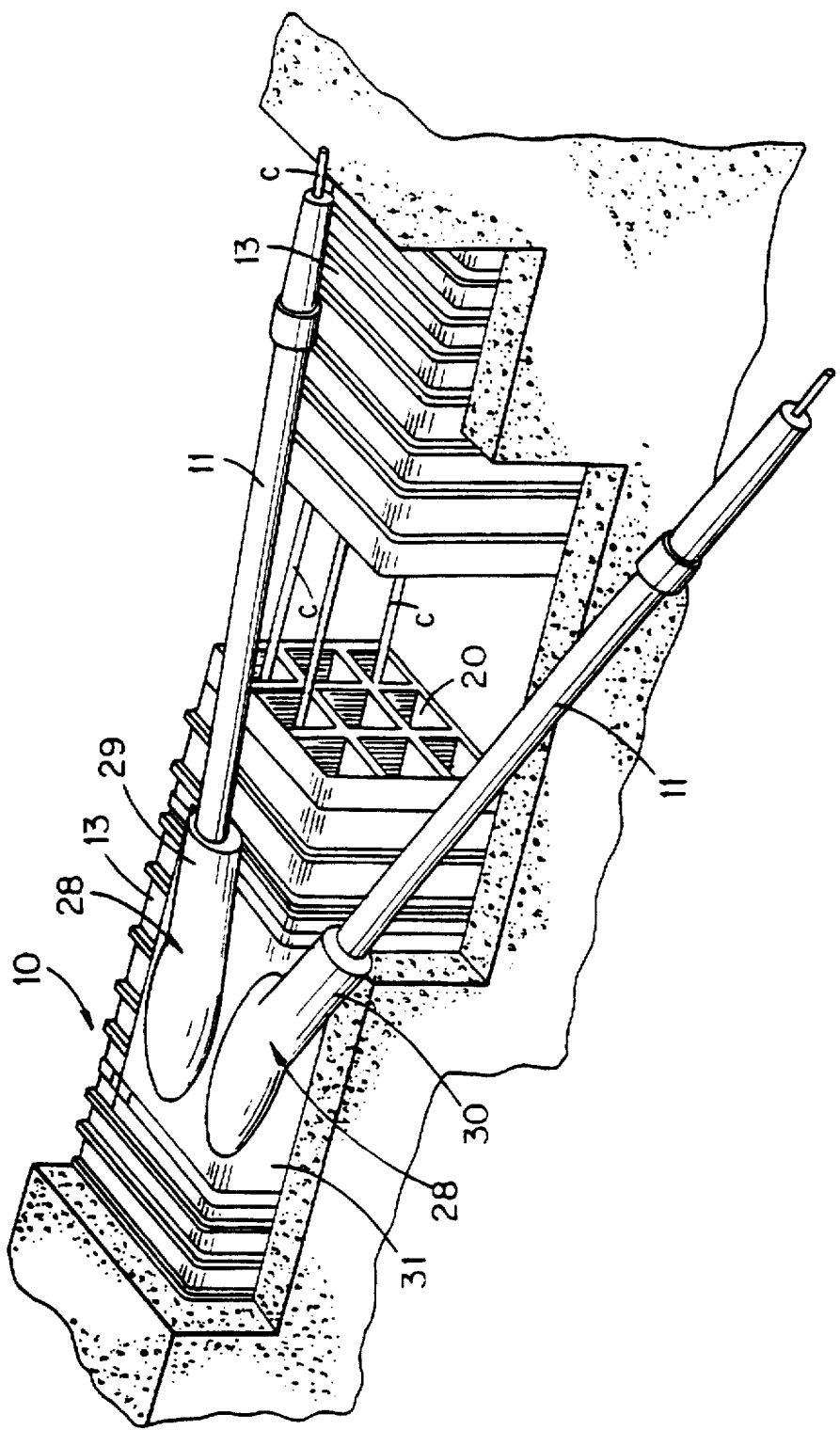
FIG. 2 is a perspective view of a prior art technique for tapping off a cable conduit.
Figure 4A:
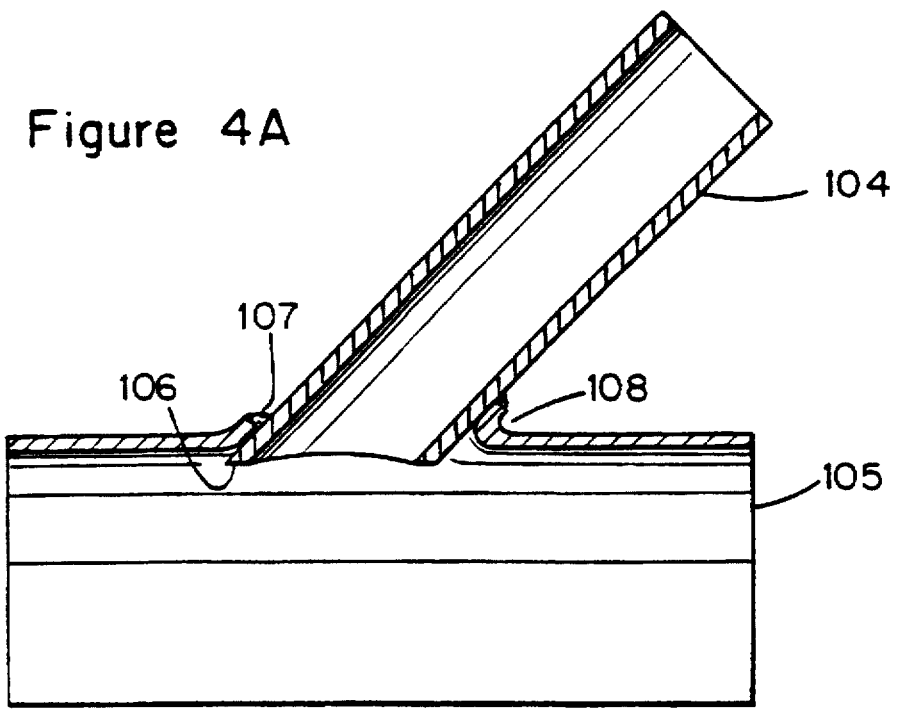
FIG. 4A is a cross-section view of one embodiment of the saddle of the present invention.

FIG. 4A shows a cross-section view of one embodiment of the saddle of the present invention. Saddle 103 of FIG. 4A is constructed from arcuate portion 105, which, as discussed above, may be made from a section of duct material cut lengthwise. Sleeve 104 may be constructed from polyvinylchloride (PVC) tubing having an inner or outer diameter which is slidably fittable over interduct 131, 132, 133, 134, 135 or 136 shown in FIG. 1B. Interducts 131, 132, 133, 134, 135 or 136 are typically constructed of polyvinylchloride (PVC) material of approximately 1.0" to 2.5" in diameter. Of course, other diameters and materials may be used for interducts 131, 132, 133, 134, 135 or 136. Further, saddle 103 may be suitably modified to join duct 101 to another duct of equal or greater diameter.

Sleeve 104 is attached to arcuate portion 105 through an opening 108 formed in arcuate member 105. Opening 108 may be formed by machining, cutting or the like, or by melting as shown in FIG. 4A. Sleeve 104 is joined to opening 108 by melting, chemical welding, or by the use of adhesive/sealant 107 or by any combination of techniques. Inner end portion 106 of sleeve 104 may be flush with the inner surface of arcuate portion 105, or may protrude slightly so as to be flush with the inner surface of duct 101 after installation.

Although sleeve 104 is shown projecting from saddle 103 at an acute angle in FIG. 4A, other angles may also be selected. For example, sleeve 104 may project from saddle 103 at a 900 angle. Further, although sleeve 103 is shown projecting from saddle 103 along the axis of arcuate portion 105, sleeve 104 may project at other angles. For example, sleeve 104 may project from saddle 103 at an angle normal to that of the axis of arcuate portion 104. It should also be noted that although only one sleeve 104 is shown here, additional sleeves may be added to saddle 103 to provide a multi-point tap-off.

Figure 4B:
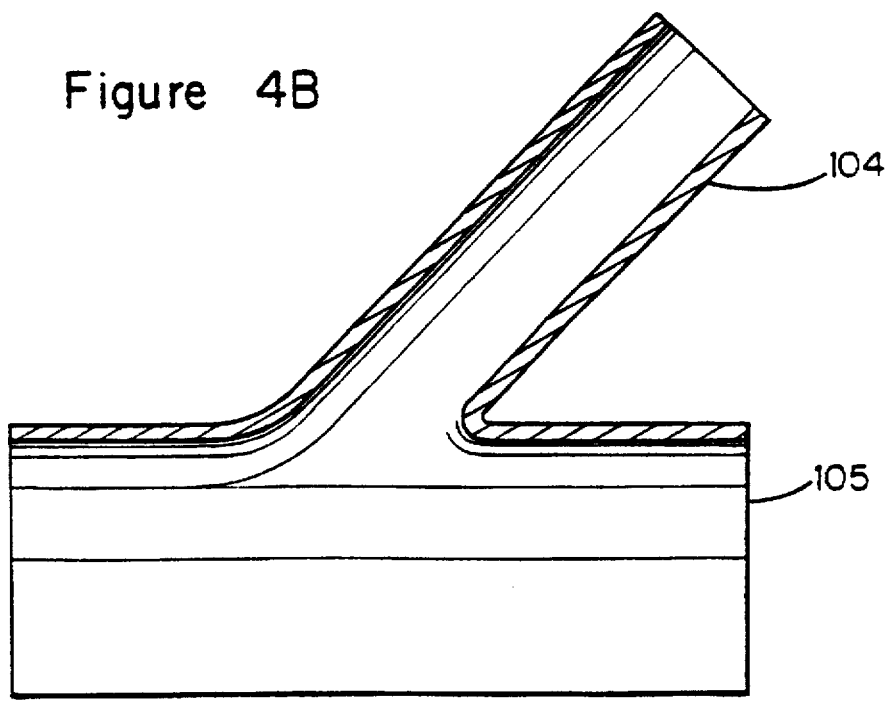
FIG. 4B is a cross-section view of an alternative embodiment of the saddle of the present invention.

FIG. 4B shows an alternative embodiment of saddle 103, which has been molded from a single piece. Here, arcuate portion 105 and sleeve 104 may be molded of polyvinylchloride (PVC) or other suitable material into a single piece using injection molding or other suitable technique. Saddle 103 of FIG. 4B may be easier to fabricate in large quantities and eliminates the possibility of leakage around opening 108 of the embodiment shown in FIG. 4A. Arcuate portion 105 of saddle 103 of FIG. 4B may be molded such that the radius of the inner surface of arcuate portion 105 is slightly less than the outer radius of duct 101 so as to provide the same gripping action as the saddle 103 of FIG. 4A.

Figure 5:
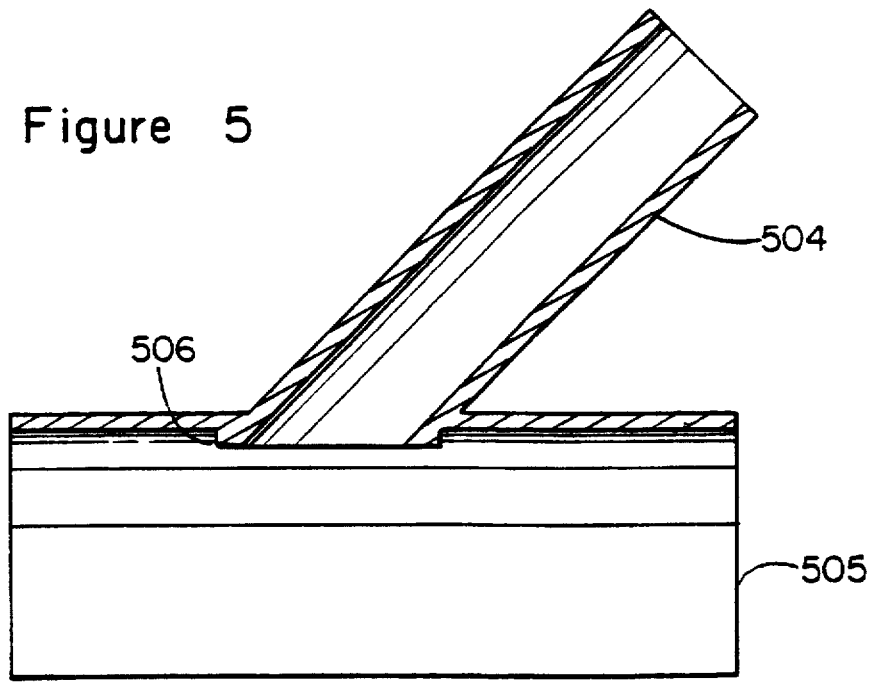
FIG. 5 is a cross-section view of an another alternative embodiment of the saddle of the present invention.

FIG. 5 shows yet another embodiment of the saddle of the present invention. To distinguish the saddle of FIG. 5 from those of FIGS. 4A and 4B, different reference numerals have been used. However, saddle 503 of FIG. 5 may be substituted for the saddles shown in FIGS. 4A and 4B. Saddle 503 of FIG. 5 is similar to saddle 103 of FIG. 4B in that it may be fabricated in one piece by injection molding or the like to facilitate construction. Saddle 503 however, has an additional raised portion 506 extending on the inner surface of arcuate portion 505 of saddle 503. Raised portion 506 may be formed so as to match the size and shape of opening 102 shown in FIG. 3. By providing a matching shape to opening 102, raised portion 506 creates a flush inner surface when installed in duct 101. This flush inner surface allows wires or cables to be more easily "snaked" through duct 101 (or corresponding interducts) without catching on any protruding or recessed surfaces. In addition, raised portion 506, by mating with the shape of opening 102, further secures saddle 503 to duct 101 so as to prevent movement of saddle 103 during adhesive, chemical welding or clamping operations. Although opening 101 shown in FIG. 3 is shown as rectangular, other sized and shaped openings may also be used along with correspondingly sized and shaped raised portion 506.

FIGS. 6A–6C, 7A–7C and 8A–8C show the techniques for outlining opening 102, pressing out opening 102, and installing saddle 103, respectively. Starting with FIG. 6A, a portion of duct 101 is exposed by digging a trench. Duct 101 is shown in broken view to illustrate cables 620, 621 and 622 passing therethrough. As used in the present application, the term "cable" may be used to mean telephone wires, coaxial cables, fiber optic cables, or other type of communication or power wiring or cabling. Alternatively, "cable" may be used to mean tubing used in pneumatic or hydraulic circuits or liquid supply lines or the like. For the sake of illustration, three cables 620, 621 and 622 are shown here, however, any reasonable number of cables or wires may be carried by duct 101. In addition.; duct 101 may also be used for other purposes, such as carrying fluids or gases or the like. Further, although duct 101 is discussed here as being buried, as discussed above, duct 101 could also be used in commercial building applications. In such applications, duct 101 may be run above a suspended ceiling, beneath a floor, or in a wall or column.

Figure 6:
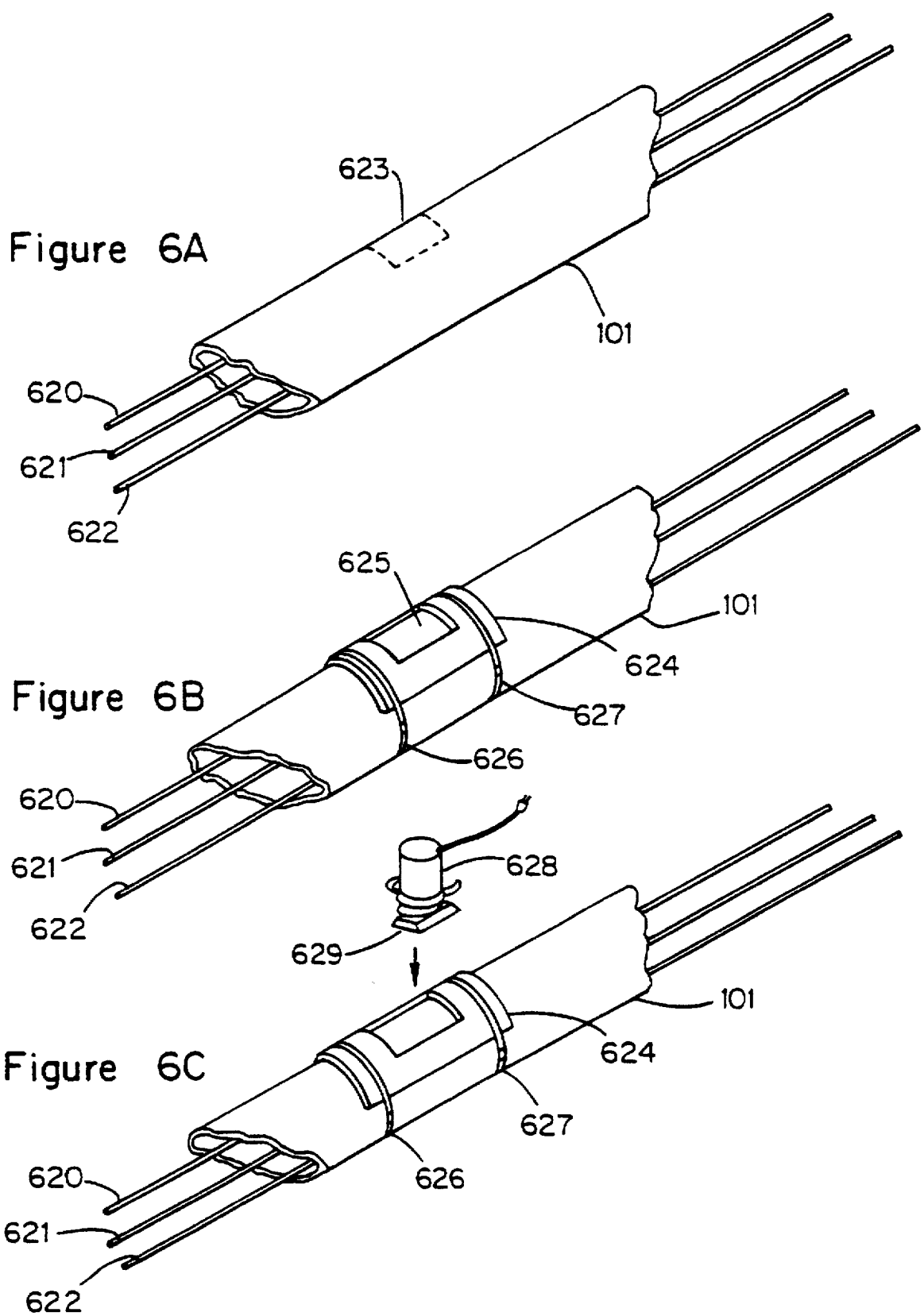
FIG. 6A is a perspective view of a duct showing a technique of the present invention for exposing a duct.
FIG. 6B is a perspective view of a duct showing the installation of the template of the present invention.
FIG. 6C is a perspective view of a duct showing the process for forming a groove in the duct.

Once duct 101 has been exposed as shown in FIG. 6A, an area 623 is selected where an opening is to be formed. In underground installations, it may be easiest to locate area 623 on top of duct 101, as the top portion of duct 101 is most easily and fully exposed when digging. Of course, area 623 may be located at any portion of duct 101 where an opening 102 is desired.

Figure 9:
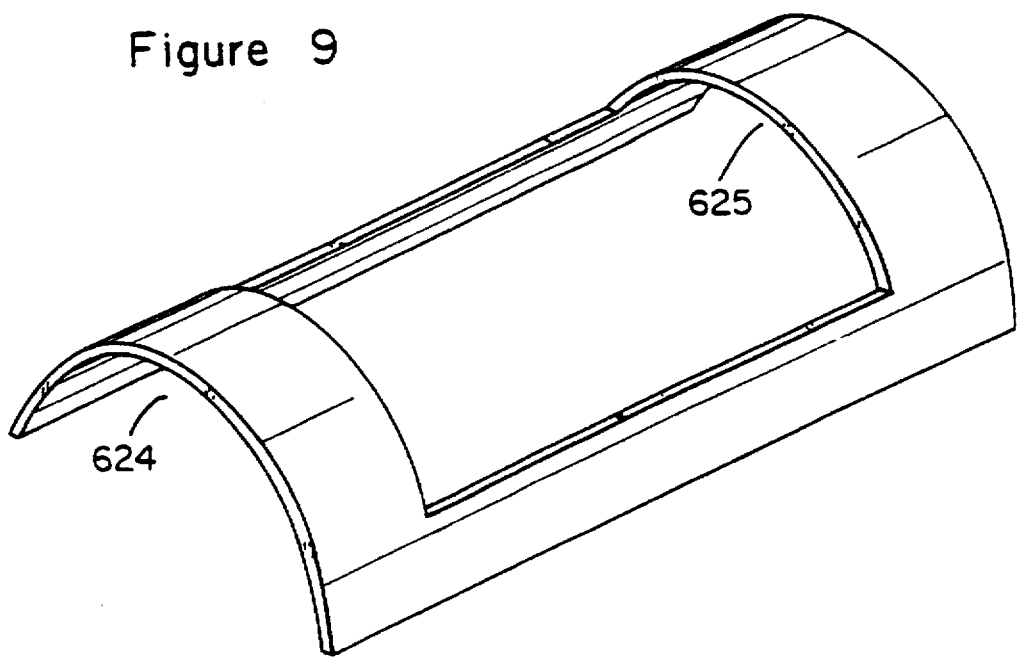
FIGS. 9 shows a template for use with the technique shown in FIG. 6A through 6C.

The exact shape of opening 102 need not be marked on area 623 as a template 624 will be used to make opening 102, as shown in FIG. 6B. Template 624 is shown in perspective view in FIG. 9. Template 624 may be easily formed from a section of duct material in a similar manner to arcuate portion 105 of saddle 103 as discussed above. Alternately, template 624 may be formed from other materials, such as plastics or metals, specially molded or machined for the purpose. Template 624 contains a cutout 625 which has the same shape but is substantially larger than the opening 102. As shown in FIG. 9 and FIG. 6C, cutout 625 is shown as rectangular, however, other shapes and sizes for cutout 625 may be used, depending on what shape and size opening 102 is desired. Template 624 may be held in place on duct 101 with band clamps 626 and 627.

FIG. 6C shows the machining process used to form a groove in duct 101. Router 628, fitted with a curved base plate 629, is operated to cut a groove 630 shown in FIG. 7A into duct 101 as will be described in more detail below in conjunction with FIG. 10A.

Figure 10A:
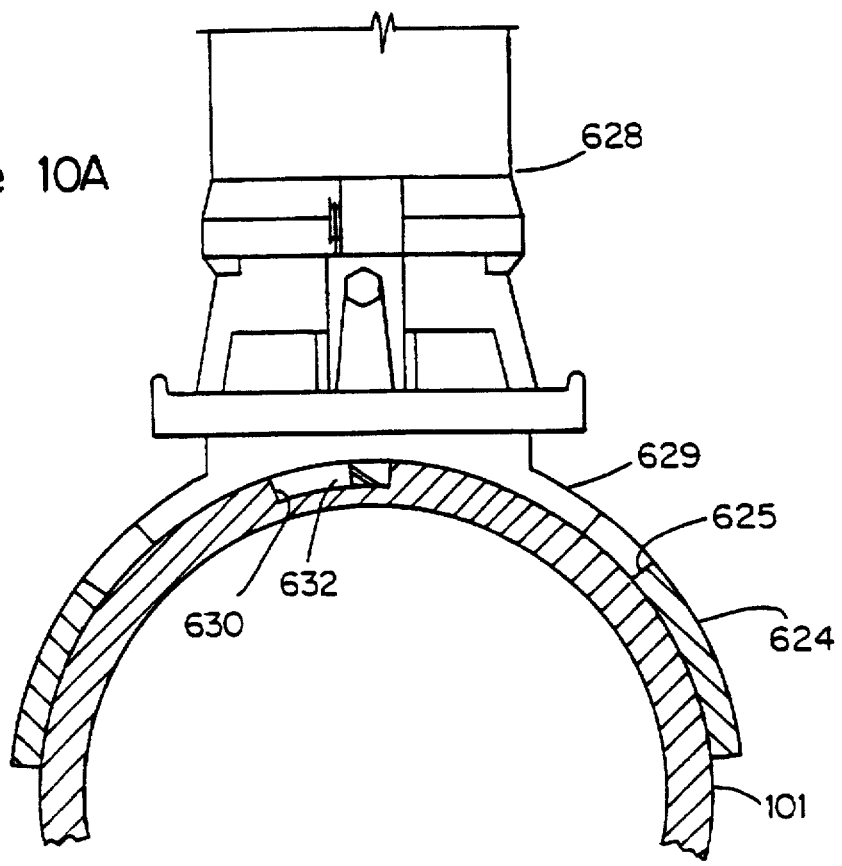
FIG. 10A is a cross-section view of the technique shown in FIG. 6C.
Figure 10B:
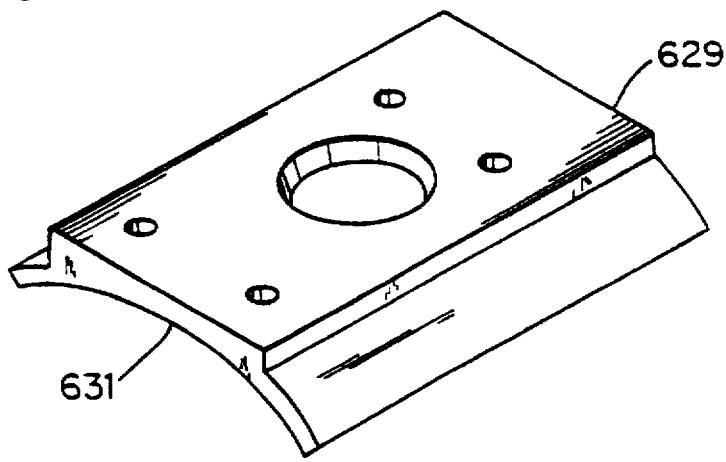
FIG. 10B is a perspective view of the base plate shown in FIG. 10A.

FIG. 10A shows a cross section view of duct 101 along with router 628 in the process of cutting groove 630. Router 628 can be any type of router used for commercial or household use. In practice, a powerful router is not needed to cut PVC, hence in the preferred embodiment a laminate cutter such a Bosch (TM) laminate cutter, typically used for cutting formica and the like is used. More powerful routers or cutting devices can be used without departing from the spirit or scope of the invention. Base plate 629 is attached to the base of router 628, typically by screws or the like. FIG. 10B shows a perspective view of base plate 629. Base plate 629 has a curved undersurface 631 which is designed with a radius substantially the same as the outer radius of duct 101. Base plate 629 can be easily fabricated from a section of duct material or can be formed from other materials specially molded or machined for the purpose. When router 628 fitted with curved base plate 629 is placed against duct 101, router 628 can slide back and forth along the axis of duct 101, as well as side to side in an arc along duct 101 while maintaining cutting bit 632 in a position normal (i.e., perpendicular) to the outer surface of duct 101.

As shown in FIG. 10A, base plate 629 is smaller than opening 625 formed in template 624. Base plate 629 travels against the edge of cutout 625. The installer, when using router 628, uses gentle pressure to push base plate 629 against the edge of cutout 625, and, following the pattern of cutout 625, creates groove 630. Groove 630 will follow the pattern of cutout 625 of template 624, however, the shape outlined by groove 630 will be smaller than the shape formed by cutout 625 by the difference in the dimensions of base plate 629 and cutout 625.

Cutting bit 632 is dimensioned with a length sufficient to pass through base plate 629 so as to cut into duct 101. As shown in FIG. 10A, cutting bit 632 does not cut through duct 101, but only through a portion thereof. By cutting only a portion of the way through duct 101, cables 620, 621 and 622 are protected from possible damage from cutting bit 632. In addition, no chips, dust or contaminants are introduced into duct 101. Cutting bit 632 may Nave a square profile as shown in FIG. 10A to cut a groove having a square profile. However, other shaped cutting bits may be used without departing from the spirit or scope of the invention. It is of course possible to modify the present invention to cut all the way through duct 101 if so desired.

Figure 7:
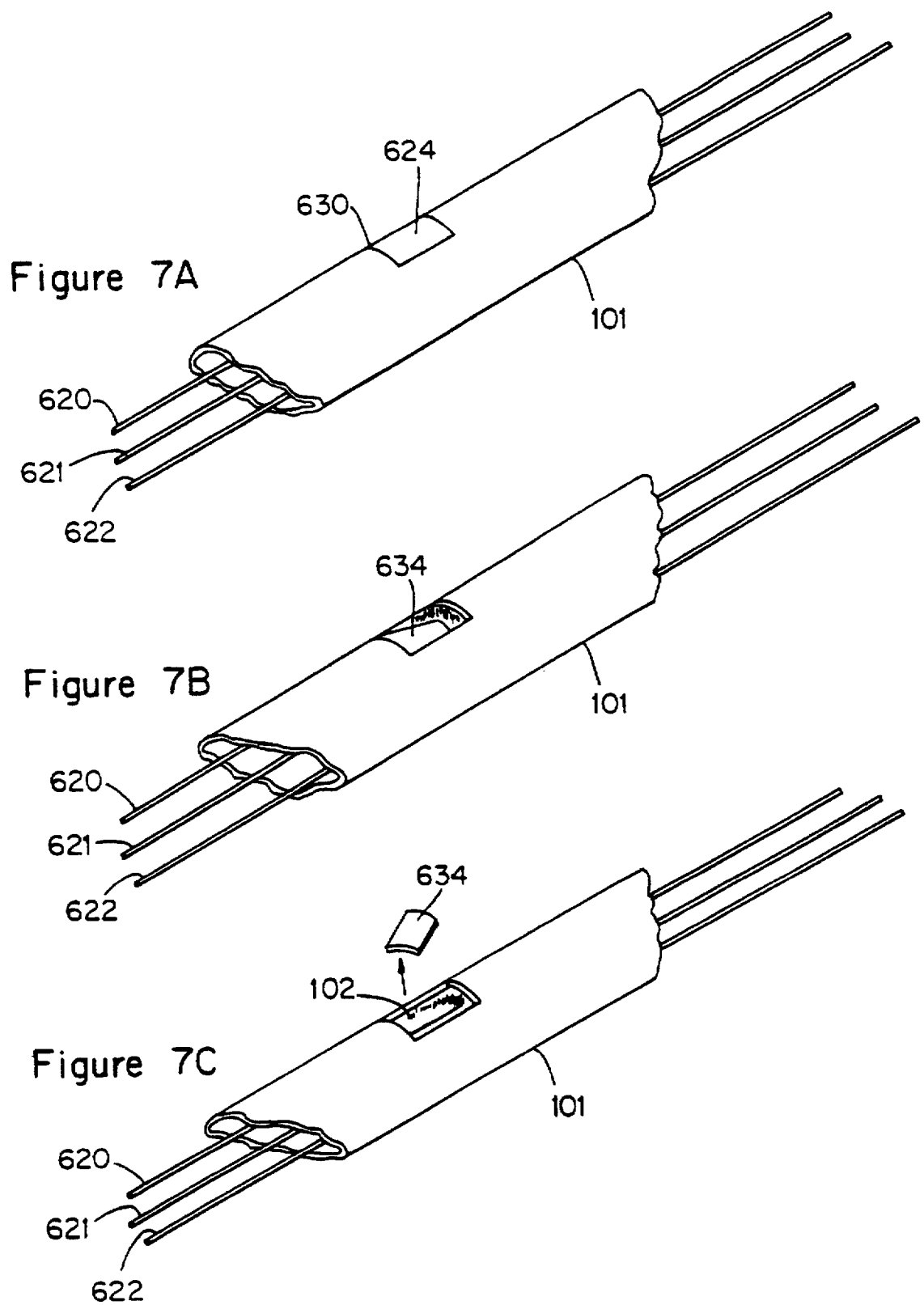
FIG. 7A is a perspective view of a duct showing the groove formed therein.
FIG. 7B is a perspective view of a duct showing an opening being formed by pressing out a knockout.
FIG. 7C is a perspective view of a duct with the knockout removed.

Once groove 630 has been cut, as shown in FIG. 7A. template 624 and optional band clamps 626 and 627 are removed. Groove 630 is shown here as being rectangular in shape, outlining the shape and size of opening 102 and forming knockout 634. As discussed above, groove 630 does not cut through duct 101, but rather only through a potion thereof. In the preferred embodiment, groove 630 is cut to a depth which exceeds at least half the thickness of duct 101.

As shown in FIG. 7B, pressure is applied to knockout 634, causing duct 101 to fracture along groove 630. Pressure may be applied by hand, with the aid of a small hammer, or by mechanical means (e.g., hydraulic ram or the like). In the preferred embodiment, groove 630 is cut deeply enough to allow knockout 634 to be pressed out with hand pressure or with the aid of a small hammer. As shown in FIG. 7C. knockout 634 is then removed, once all of groove 630 has fractured, forming opening 102, and exposing cables 620, 621 and 622.

Figure 8:
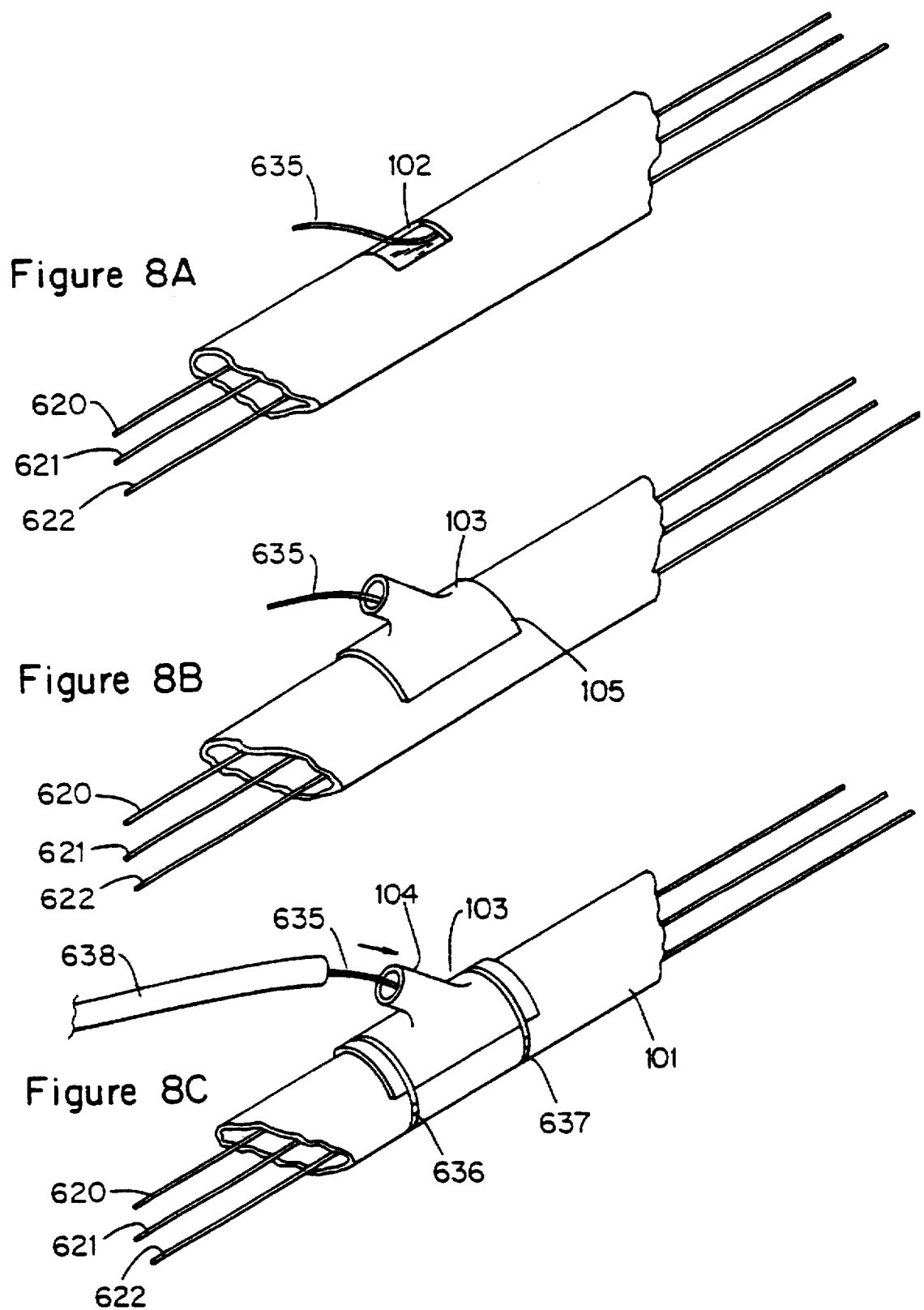
FIG. 8A is a perspective view of a duct with a cable snaked through an opening.
FIG. 8B is a perspective view of a duct with a saddle in place over an opening.
FIG. 8C is a perspective view of a duct showing the attachment of interduct to the saddle.

As shown in FIG. 8A, a cable 635 may be then snaked out through opening 102. Cable 635 may be a cable spliced from one of cables 620, 621 or 622, or may be an additional cable run through duct 101. Further, although only one cable 635 is shown here for the sake of illustration, any reasonable number of cables may be run through opening 102. In addition, although cable 635 is shown here as snaked though at this stage, saddle 103 may be installed first and cable 635 snaked through at a later stage. As shown in FIG. 8B, cable 635 is then threaded through saddle 103 which is then fitted over opening 102. In the preferred embodiment, the inner radius of the arcuate portion 105 of saddle 103 is sized such that saddle 103 exerts a gripping action on duct 101.

Adhesive or welding chemicals may be applied to saddle 103 prior to its installation on duct 101. Clamps 636 and 637 may be used to hold saddle 102 firmly against duct 101 while the adhesive or chemical weld cures. Alternatively, the gripping action of saddle 103 may be sufficient to hold saddle 103 during curing. In an alternative embodiment, a gasket (not shown) may be used with saddle 103 which may be attached to duct 101 by band clamps 636 and 637. This alternative embodiment is especially useful if the installation of saddle 103 is temporary.

Once saddle 103 has been installed, cable 635 (if present) is snaked thought interduct 638 and interduct 638 is attached to sleeve 104 of saddle 103. Interduct 638 may have a diameter such that it is slidably fittable over the inside or outside of sleeve 104. Interduct 638 may be attached to saddle 103 using the same techniques available to attach saddle 103 to duct 101 (e.g., adhesive, chemical welding, band clamps or the like). If cable 635 is not present, interduct 638 may be attached and a suitable cable snaked through at later date.

Figure 10C:
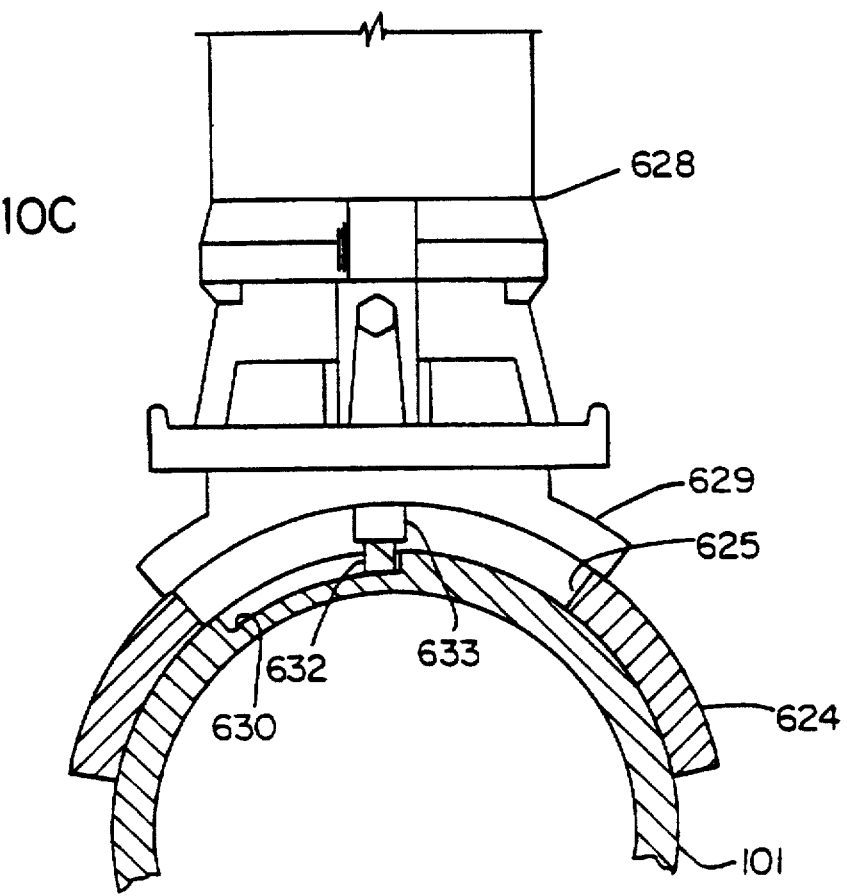
FIG. 10C is a cross-section view of an alternative embodiment of the technique shown in FIG. 10A.

FIG. 10C shows an alternative embodiment of the technique of FIG. 10A. Rather than resting against duct 101, base plate 629 is slidably fittable over template 624 which has an opening 625 smaller than base plate 629. Cutting bit 632 is fitted with a smooth collet 633 when travels against opening 625. As in FIG. 10A, cutting bit 632 is preferably dimensioned to cut only a portion of the way through duct 101. The technique of FIG. 10C may be preferred when it is desirable to form an opening 102 in duct 101 which is not square (e.g., oval, round or the like).

Although described above as used in connection with communications cables, the present invention may be modified for other uses without departing from the spirit or scope of the invention. For example, the saddle could also be applied to splice water lines such as lawn or fire sprinkler systems. In such systems, cutting into an existing line creates the hazard of introducing particulate waste material (e.g., dust or chips form the cutting process) into the line. Such matter can later clog a sprinkler head, with potentially disastrous results in the case of a fire sprinkler. The template cutting technique of the present does not cut into the line, but allows a window to be formed which can be manually punched out, effectively eliminating any contamination hazard.

In addition, the template cutting technique of the present invention could also be applied to other devices where it is desired to form a knockout. Although shown here as being used with a duct having a round contour, the technique of the present invention could also be applied to other shaped and sized ducts, as well as to other surfaces, walls or the like having other contours. Similarly, although the saddle of the present invention is shown as being used in conjunction with round conduit, such a saddle could be suitably modified to fit other types of conduits or enclosures without departing from the spirit or scope of the invention.

I claim:

1. A method for forming an opening in a wall, comprising the steps of:

cutting away an outer portion of said wall so as to form a groove in the outer portion of said wall, said groove defining an outline of the opening to be formed in said wall; and dressing out that portion of the wall encompassed by said groove to form an opening in said wall;

wherein said step of cutting further comprises the steps of:

fixing a template to said wall, said template having a contoured portion having a contour substantially matching said wall, said template further having a window portion having substantially the same shape as the opening to be formed in said wall, said window portion being formed on the contoured portion of said template;

providing a base plate having a contoured undersurface with a contour substantially the same as the contour of the contoured portion of said wall such that said base plate is slidably fittable within said window over said wall, said base plate having a hole passing through the contoured portion thereof;

fixing a cutting device to said base plate, said cutting device having a cutting element extending through the hole in said base plate and having a length sufficient to extend into said wall when said base plate is slidably fitted to wall; and cutting the groove in the wall with the cutting element traveling against the edge of said window portion.

2. A method for forming an opening in a contoured duct having a radius, comprising the steps of:

fixing to said duct a template having an arcuate portion having a radius substantially the same as said duct, said template having a window portion of substantially the same shape as the opening to be formed in said duct, said window portion being formed within said arcuate portion of said template;

providing a base plate having an arcuate undersurface with a radius substantially the same as the radius of the arcuate portion of said duct such that said base plate is slidably fittable within said window portion on said duct, said base plate including a hole for accepting a cutting device having a cutting element extending through the hole in said base plate and having a length sufficient to extend into at least a portion of said duct when said base plate is slidably fitted to said duct;

cutting away an outer portion of said duct so as to form a groove in the outer portion of said duct outlining the opening to be formed in said duct; and pressing out that portion of the duct encompassed by said groove to form an opening in said duct.

3. The method according to claim 2, comprising providing at least one cable extending axially in the duct.

4. The method according to claim 3, comprising providing a plurality of axially extending cables.

5. The method according to claim 4, comprising providing the cables as fiber optic cables.

6. The method according to claim 1, comprising cutting the groove to a depth which exceeds one-half of the duct thickness.

7. A method for forming an opening in a wall, comprising the steps of:

cutting away an outer portion of said wall so as to form a groove in the outer portion of the wall, said groove defining an outline of the opening to be formed in the wall; and pressing out that portion of the wall encompassed by the groove to form said opening in the wall;

wherein the step of cutting further comprises the steps of:

fixing a template to the wall, said template having a window portion of substantially the same shape as the opening to be formed in the wall;

providing a base plate such that said base plate is slidably fittable within said window portion over the wall, the base plate having a hole passing through a portion thereof, said base plate comprising a cutting device affixed thereto, said cutting device having a cutting element extending through the hole in the base plate and having a length sufficient to extend into the wall when the base plate is slidably fitted to the wall; and cutting the groove in the wall with the cutting element traveling against the edge of the window portion.

8. The method according to claim 7, comprising forming the opening in the wall of a contoured duct.

9. The method according to claim 8, comprising providing at least one cable extending axially within the duct.

10. The method according to claim 9, comprising providing a plurality of axially extending cables.

11. The method according to claim 10, comprising providing the cables as fiber optic cables.

12. The method according to claim 7, comprising cutting the groove to a depth which exceeds one-half of the wall thickness.

13. The method of claim 8, comprising forming the template to have a contoured portion having a contour substantially matching that of the wall.

14. The method of claim 13, comprising forming the base plate with a contoured undersurface having a contour substantially the same as that of the wall.

* * * * *